July 11, 1944.                J. P. SLATER                2,353,514
                        PROTECTIVE DEVICE FOR DRILLS
                             Filed May 5, 1943
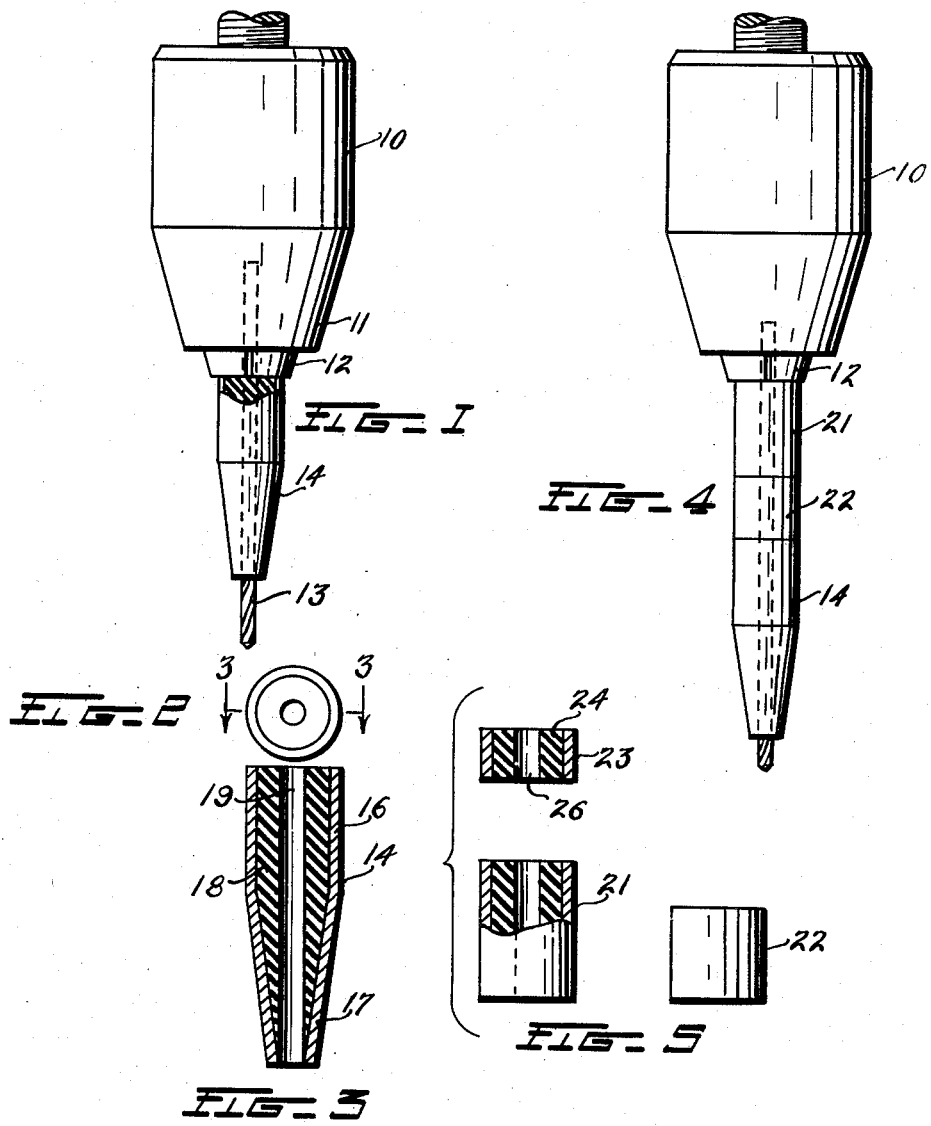
Inventor
Jay P. Slater
By Richmond S. Hayes
Attorney Patented July 11, 1944

2,353,514

UNITED STATES PATENT OFFICE 2,353,514

PROTECTIVE DEVICE FOR DRILLS

Jay P. Slater, Lakewood, N. Y.

Application May 5, 1943, Serial No. 485,733

7 Claims. (Cl. 77—55)

This invention relates to an improved protective device for drills and more particularly to a device for use with small diametered drills.

In the use of drills of small diameter, a considerable loss occurs from drill breakage necessitating replacement or regrinding where possible. This breakage is expensive, both from the standpoint of cost of replacement and loss of time in replacing or re-grinding. It is due largely to the fact that when sufficient pressure is applied to advance the drill into a given material, it tends to bow or bend, and such bowing, if at all excessive, causes breakage at the weakest point between the drill end and the clamping chuck. Furthermore, small drills, being frequently operated at high speed, have a tendency to vibrate and this not only makes difficult the initial centering on a given piece of work, but also renders the drill more susceptible to breakage in the manner already mentioned.

The present invention has been developed for the purpose of overcoming the cost and inconvenience of small drill breakage, and this, therefore, constitutes its principal object.

Another object of the invention lies in the provision of a device of the nature of a vibration damper, being in the form of a protective sleeve with which to encase a considerable portion of the free length of the drill.

Another object of the invention lies in the provision of a protective sleeve for a considerable portion of the free length of the drill that has resilient engagement with the drill and thus enables normal flexing without undesirable vibration.

Another object of the invention lies in the provision of a vibration damper for drills in the form of multiple sleeves by which to encase the free length of the drill to any desired extent.

A further object of the invention lies in the provision of a protective sleeve for encasing the free length of the drill, the sleeve being in multiple lengths so as to facilitate their use as a drill depth gauge.

Other objects and advantages of the invention will be more fully understood from a consideration of the following specification, taken in conjunction with the accompanying drawing; and in which Fig. 1 is a side elevational view of a chuck mounted drill to which is applied one form of the invention;

Fig. 2 is an enlarged upper end view of the invention;

Fig. 3 is a vertical sectional view, taken substantially on the line 3—3 of Fig. 2;

Fig. 4 is a side elevational view of the invention in conjunction with additional or multiple parts by which to encase a drill of greater length than the drill shown in Fig. 1;

Fig. 5 is a view of the multiple parts shown in Fig. 4, certain of these parts being broken away to disclose their structural details.

Referring to the drawing, the reference numeral 10 is employed to designate a conventional clamping chuck and includes a lower open-ended portion in which are located adjustable clamping jaws 12. A drill 13, inserted between the jaws, is secured by rotation of the chuck which brings the jaws into clamping engagement with the shank end of the drill. The extent to which the jaws 12 extend below the lower end of the chuck varies with the diameter of the drill; that is, these jaws will be found to extend further with small diametered drills than with large diametered drills.

That portion of the drill extending from the jaws 12 to the end is always of considerably greater length than the portion of the drill within the chuck. In large drills, the material from which the drill is formed provides sufficient ruggedness so that in application to work such a drill will not bow nor set up excessive vibration. However, in small diametered drills, that portion of each drill known as the free length has only approximately half the drill's thickness for its support, and when normal pressure is applied, this free portion of the drill bows and vibrates to an excessive extent, often resulting in breakage.

The present invention, applied to this free portion of a small diametered drill, comprises a sleeve or casing 14. The upper portion 16 of this casing is cylindrical, and the lower portion 17, conical. Mounted within the casing is a block 18, so designed as to closely engage the walls of the casing 14 throughout its length, and through which an opening 19 is made; this opening being of a diameter slightly less than the diameter of a drill to which it may be applied. The block 18 is formed from a material having a resiliency sufficient to permit compression of the walls about the opening 19 to pass the drill 13 therethrough. Although the drill 13 is thus closely engaged by the block 18, which in turn is held by the non-resilient casing 14, there is, nevertheless, sufficient resiliency for any normal, initial bowing of the drill when fitted with the device and applied to a given work. It will be noted that the block 18 is co-extensive with the casing 14, which is of such diameter that when applied to the drill and moved upwardly thereof, may be brought into abutment with the lower ends of the jaws 12 of the chuck. Of course, the casing 14 is squared, as are the chuck jaws, and is therefore well seated against these jaws.

To a considerable extent, small diametered drills are used in high speed production and frequently in multiple arrangement, and it is necessary that the drill penetrate only to a predetermined depth of the work. The casing 14 may serve the purpose of a depth gauge by merely positioning it in abutment with the lower end of the jaws 12 and adjusting the drill 13 upwardly or downwardly of the chuck until only the desired free or useful portion of the drill extends beyond the lower end of the casing. Since wear occurs through use of these drills and they must be frequently re-sharpened, their length may be reduced; or, in the case of an occasional broken drill, it may still be utilized by sharpening the broken end. Under such circumstances, the drill may be adjusted, as already mentioned, and the casing will continue to serve as a depth gauge, in addition to its function of preventing undesired bending or vibration. In this same connection, it may occur that the chuck 10 will not receive the shank of the drill to an extent to permit use of the casing as a depth gauge. The modifications shown in Figures 4 and 5 of the drawing contemplate adapting it to these conditions. Herein are shown, by way of illustration, three additional casings, 21, 22, and 23. These casings are cylinders having the same inner and outer diameters as the casing 14. They are each fitted with resilient blocks 24, through which openings 26 are made; the openings 26 corresponding in diameter to the opening 19 of the casing 14. The material from which the blocks 24 are made is of comparable resiliency to that of block 18. By way of a specific showing, Fig. 4 illustrates the use of the casing 14 in conjunction with the sleeves 21 and 22. Herein the upper edge of sleeve 21 abuts the lower edges of jaws 12 of the chuck 10, sleeve 22 in turn abuts sleeve 21, and casing 14 in turn abuts sleeve 22. In this manner a new drill, or one having greater free length than drill 13, may not only be encased and protected against undue vibration or bending, but such casing may also serve as a depth gauge. It is contemplated, through the provision of one or more sleeves, such as shown in Fig. 5, in conjunction with the casing 14 and by reason of the normal adjustability of a drill within a chuck, that the present invention may be used as a gauge for determining the depth of any hole it may be desired to drill.

Although applicant has shown and described only one form of his invention, it will be apparent that the drill casing may be altered as to length or diameter, or that the block within the casing may have greater or lesser resiliency and be apertured to receive drills of a different size from that shown, and such variations or modifications are therefore within the spirit and scope of the invention as set forth in the annexed claims.

Having thus set forth my invention what I claim as new and for which I desire protection by Letters Patent is:

1. An enclosure for the free length portion of a drill comprising a casing, a resilient member mounted in and being coextensive with said casing, said member having an opening extending lengthwise therethrough and adapted to receive and engage a considerable portion of the free length of said drill, one end of said casing being adapted to abut a holder for said drill.

2. An enclosure for the free length portion of a drill comprising a casing having integral cylindrical and conical parts, a resilient member mounted in and substantially coextensive with said casing and being permanently joined thereto, said member having a centered opening extending lengthwise therethrough adapted to receive and engage a portion of the free length of said drill.

3. An enclosure for the free length portion of a drill comprising a casing having integral cylindrical and conical parts, a resilient member mounted in said casing and having a centered lengthwise extending opening, the walls of said opening being of a slightly lesser diameter than said drill and being adapted to firmly engage said drill, one end of said casing providing a seat for abutment with a holder for said drill.

4. An enclosure for the free length portion of a drill comprising a casing having integral cylindrical and conical parts, a resilient member mounted in and substantially coextensive with said casing and being permanently joined thereto, said member having a centered lengthwise extending opening therein, the diameter of said opening being less than the diameter of said drill whereby to provide permanent operable positioning of said casing on said drill, one end of said casing being provided with a seat for abutment with a drill holder or a further casing.

5. A protective device for the free length portion of a drill comprising means for enclosing a considerable part of said free length portion, said means including rigid outer and resilient inner parts permanently bonded together and a centered full length opening of a diameter less than the diameter of said drill, said drill projecting through said opening and the resilient parts having such engagement therewith as to provide permanent operable positioning of said device on said drill.

6. A protective device for mounting on the free length portion of a drill comprising means for enclosing a considerable part of said free length portion, said means including rigid cylindrical and conical sleeves, and resilient blocks fitted in and permanently bonded to said sleeves, said blocks having concentric openings of a diameter to provide a tight yielding fit for said drill.

7. A protective device for mounting on the free length portion of a drill comprising a multiplicity of rigid cylindrical sleeves, resilient blocks mounted in and permanently bonded to said sleeves, said blocks having concentric openings of a diameter to provide a tight yet yielding fit for said drill, and means forming a part of each sleeve providing for abutment with a drill holder or another sleeve.

JAY P. SLATER.